Dec. 24, 1929.     C. F. JENKINS     1,740,654
CONTACT SCANNING DISK
Filed Nov. 5, 1928
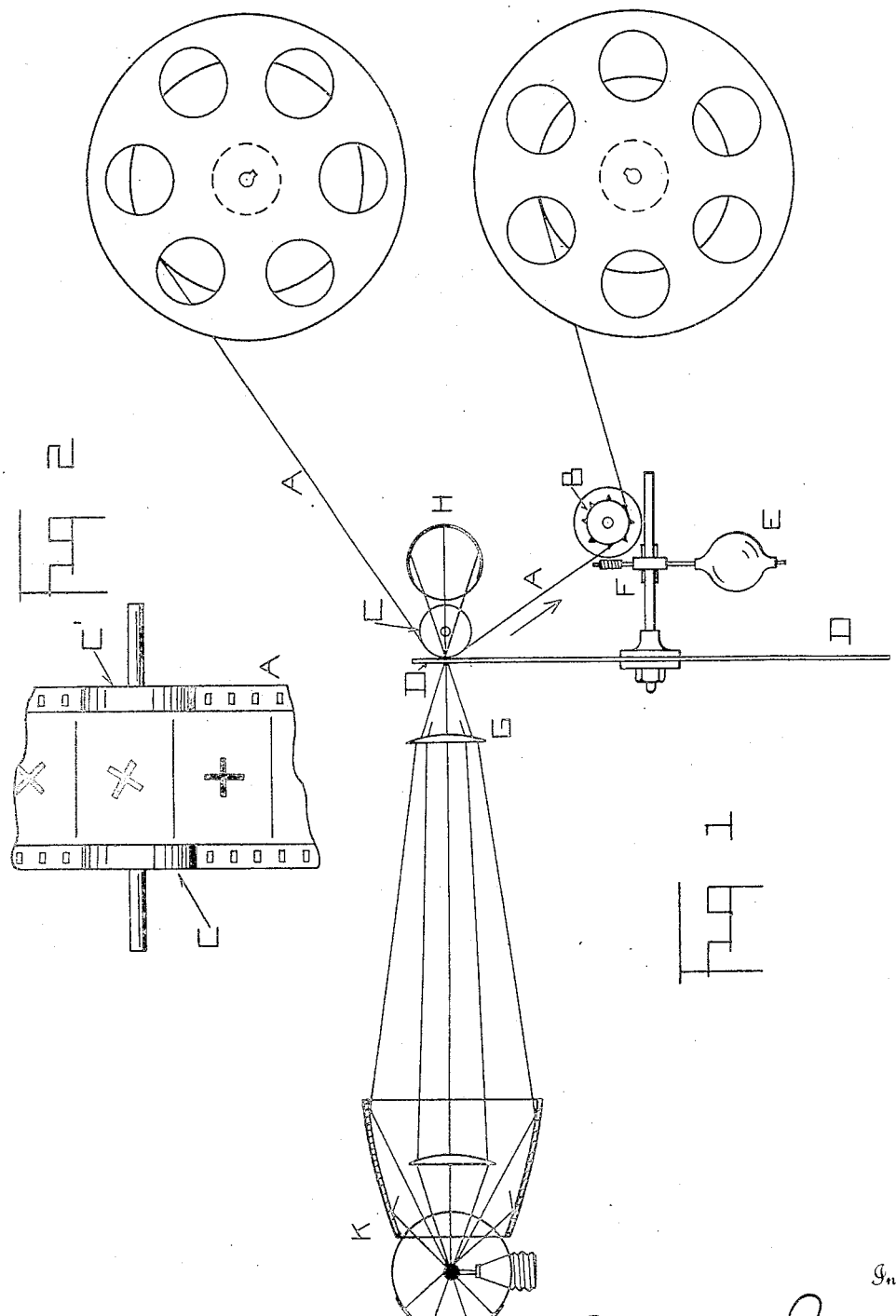
Inventor
C. Francis Jenkins
Witness:

Patented Dec. 24, 1929

1,740,654

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

CONTACT SCANNING DISK

Application filed November 5, 1928. Serial No. 317,286.

This invention relates to devices for transmitting radiomovies, and has for its principal object an efficient but simpler and less expensive mechanism for scanning motion picture film than that shown in application Serial No. 244,323.

The mechanism illustrated in the application cited is excellent, as has been found in actual broadcast of radiomovies for many weeks prior to this application, but the high cost of the device prevents its wide acceptance by broadcast stations. In the invention described herein an inexpensive circularly-perforated disk is substituted for the lens-disk, each of the forty-eight lenses of which cost above a hundred dollars in place in the disk.

The object in the use of the lenses was to get a minute mobile point of light impinging on the film. The lens does this excellently, but is costly.

The perforated disk running almost in contact with the film with light directed by projection onto the film attains the same result, as has been found in actual radiomovies transmission.

With this and other objects in view the invention consists of the novel combination of elements described in the specifications, illustrated in the drawings herewith, and especially pointed out in the claims.

In the schematic drawings of the invention, Figure 1 is an elevation; and Figure 2 detail thereof.

In the drawings A is a motion picture film, advanced by sprocket B over the rollers C, which hold the film approximately in contact with the scanning disk D.

The motor E, through suitable gearing F, gives motion to both the film sprocket B and the scanning disk D.

G is a cylindrical lens so located as to make a concentrated line of light from the source K. Along this concentrated line of light the apertures in the disk travel, and the length of the line of light is equal to or slightly greater than the separation of adjacent apertures.

H is the light-sensitive cell, and the cell-shape, and the location of it, is such that the greatest area of the cell lining is exposed to the light passing through the film.

Although the rollers C and C' (Fig. 2) are separated, as usual in the support of film in standard motion picture mechanisms, in this device the usual hub between the roller ends has been cut away, permitting the light to pass therebetween.

One of these, the C roller, has been left out in Fig. 1, to show how the beam of light is brought to a concentration on the scanning disk, passes through the elementary area apertures in the scanning disk, through the film as it moves in approximate contact therewith, and then spreads out to impinge on the greatest possible area of the cell.

This approximate contact of scanning disk and film, with projection-directed light on the apertures, has been found to produce the required minuteness of scanning light-spot required for the proper analysis of the film picture frames; and the linear spot concentration of the light cone conserves the light from the source.

The operation of the mechanism is believed probably to be easily understood from the drawings; namely, the light is projected through the cylindrical lens G in a thin, highly-concentrated line on the arc of movement of the apertures. The film being closely contiguous to the apertures on the opposite side of the scanning disk is scanned by directed spots of light of elementary area, because the film is so close to the apertures that the light does not have a chance to diffuse or diverge until after it has passed through the film. Beyond the film the light spreads out as it impinges on the cell, which is advantageous.

It has also been found extremely desirable to bend the film at the point where it is scanned, because such transversal bending of the film causes it to lie very close to, or even touching, the scanning disk across its whole width, which result is not assured when the film runs parallel to the face of the disk for any distance.

What I claim, is—

1. In a mechanism of the class described, the combination of a motion picture film in constant forward movement; a disk having apertures therein arranged to scan said film; means for holding the film in approximate contact with the scanning disk; means for maintaining a definite relative movement of film and disk, and means for illuminating said disk with a concentrated line of light.

2. In a mechanism of the class described, the combination of a motion picture film; a disk having scanning apertures therein and in approximate contact with said film; means for maintaining a definite relative movement of film and disk; and means for illuminating said scanning apertures with a line of light.

3. In a mechanism of the class described, the combination of a motion picture film; a disk having scanning apertures therein and in approximate contact with said film; means for maintaining a definite relative movement of film and disk, and means for illuminating said disk with a concentrated line of light.

4. In a mechanism of the class described, the combination of a rotating disk having peripherally arranged apertures therein; a film to be scanned by said disk, said film being transversely bent at the point of closest location of the disk.

5. In a mechanism of the class described the combination of a motion picture film, a scanning member having scanning apertures therein, means for maintaining said film in approximate contact with said member at the scanning point, means for maintaining a definite relative movement of said film and said member, and means for illuminating said scanning member with a concentrated line of light.

6. In a mechanism of the class described the combination of a rotating scanning member having a series of scanning apertures therein, a film to be scanned by said member, said film being transversely bent at the region of close location to said scanning member.

7. In a mechanism of the class described the combination of a motion picture film, a rotatable scanning member having apertures therein, means for rotating said member to cause each aperture to scan different linear elements across the width of said film, and means for maintaining said film in approximate contact with said member substantially only in the region of each linear element that is being scanned.

8. The method of scanning a motion picture film which comprises illuminating a rotatable scanning device on one side with a concentrated line of light; positioning the motion picture film on the other side of said scanning device and in approximate contact therewith substantially only in the region of each linear element that is being scanned.

9. The method according to claim 8 in which the film is bent along each linear element as it is scanned.

10. In a mechanism of the class described the combination of a scanning device having scanning apertures, means for projecting on said device a concentrated line of light, a continuously moving motion picture film, a photo-sensitive device, and a roller between said photo-sensitive device and said film for maintaining said film in approximate contact with said scanning device in a relatively narrow linear element across the width of the film.

In testimony whereof I have affixed my signature.

CHARLES FRANCIS JENKINS.